Oct. 17, 1944. J. P. SPANG 2,360,729
MEAT TREATING MACHINE
Original Filed Jan. 5, 1943
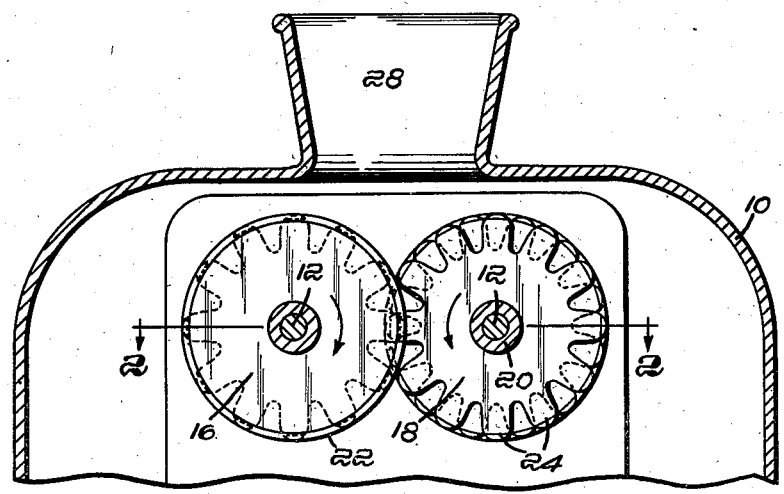
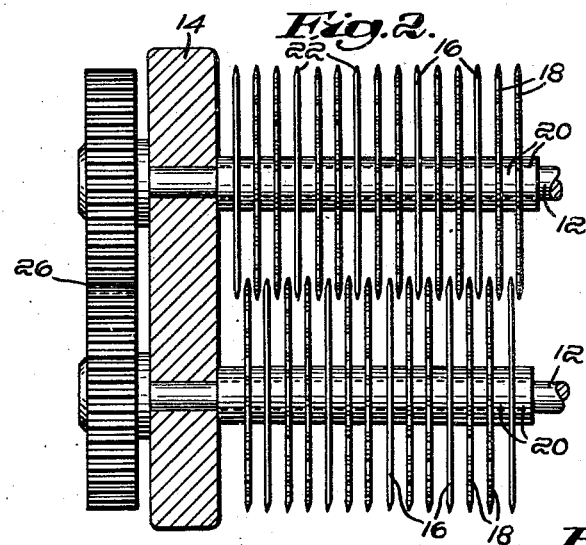
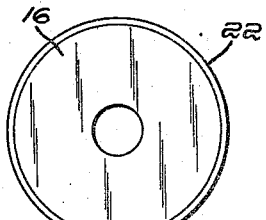
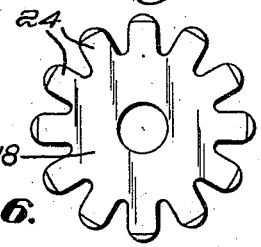
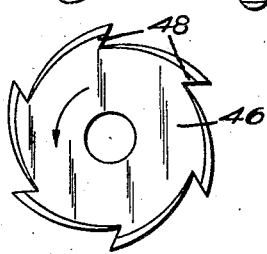
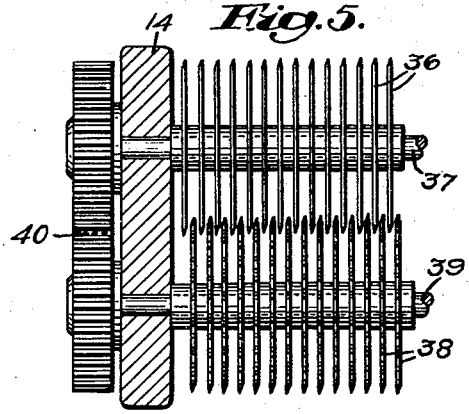
Inventor:
Joseph P. Spang,
by Kenway & Witter
Attorneys Patented Oct. 17, 1944

2,360,729

UNITED STATES PATENT OFFICE 2,360,729

MEAT TREATING MACHINE

Joseph P. Spang, Quincy, Mass., assignor to Cube Steak Machine Co., Boston, Mass., a corporation of Massachusetts Continuation of application Serial No. 471,349, January 5, 1943. This application May 19, 1943, Serial No. 487,552

4 Claims. (Cl. 17—26)

This application is a continuation of my application Serial No. 471,349 filed January 5, 1943. The invention relates to meat treating machines and more particularly to a machine for simultaneously slitting and tenderizing meat and knitting it into unit pieces. Two types of meat treating and tenderizing machines heretofore employed are adapted respectively (1) to slit an individual steak continuously along a plurality of parallel lines, and (2) to slit discontinuously along parallel lines and unite small pieces of meat together into a single piece having the appearance of an individual steak, the discontinuous slitting action of the latter serving to tenderize the meat to some degree but not being as effective as when used in conjunction with the first machine. The markets have therefore been required to purchase two machines for effecting these functions. The primary object of my invention resides in the production of a single machine that will perform these operations fully as effectively as they have heretofore been performed by both said machines.

In my copending application, Serial No. 413,944 filed October 7, 1941, I have disclosed a meat treating machine having two seats of meat treating rolls. One set is provided with knifing disks adapted to discontinuously slit and knit the meat and the other set is provided with annular cutting disks adapted to continuously slit the meat. If the meat is to be thus fully slitted, tenderized and knitted it is necessary to put it through both sets of treating rolls. Another object of the invention herein is to produce a machine which will perform both slitting operations simultaneously with one passage of the meat through the machine.

The invention particularly concerns the novel combining of full slitting disks together with intermittent slitting disks or knives into a single pair of meat treating rolls, the rolls embodying two adjacent and parallel shafts supporting the disks thereon in such relation that a piece of meat passed therebetween is simultaneously treated by both types of disks thereby simultaneously, continuously and discontinuously slitting the meat. The discontinuous slitting disks are furthermore adapted to tuck the cut fibres into the meat upon repeated passage of the meat through the rolls thereby knitting and compressing the meat into the most compact and desirable form. The production of such an improved machine comprises a primary object of the invention.

These and other features of the invention will be best understood and appreciated from the following description of preferred embodiments thereof selected for purposes of illustration and shown in the accompanying drawing in which, Fig. 1 is a fragmentary cross sectional view through a meat treating machine embodying my invention, Fig. 2 is a fragmentary view taken on line 2—2 of Fig. 1, and showing the meat treating rolls in plan, Fig. 3 is a face view of one of the continuous slitting disks, Fig. 4 is a face view of one of the discontinuous slitting and knitting disks, Fig. 5 is a view like Fig. 2, but showing a modified arrangement of disks, and Fig. 6 illustrates a slightly modified form of continuous slitting disk.

A preferred form of the invention is illustrated in Figs. 1–4 of the drawing wherein 10 indicates a housing within which is mounted a pair of relatively adjacent and parallel shafts 12 supported at their ends on bearings in end plates 14. Non-rotatably mounted on the shafts are continuous slitting disks 16 and knifing-knitting disks 18, washers 20 or the like being employed to hold the disks in spaced relation. The slitting disks 16 have continuous annular cutting edges 22 on and along their peripheries and the knifing disks 18 have interrupted peripheries providing flat knife-like blades 24 disposed outwardly therearound, the knifing disks being located between the slitting disks in such arrangement that the two disks on opposite sides of each slitting disk are knifing disks and are mounted on the shaft opposite to that carrying the slitting disk. The disks on each shaft are disposed alternately with the disks on the other shaft and extend inwardly of the peripheral outline of the disks on the other shaft. The disks are of thin knife-thickness steel of sufficient strength to be self-supporting on their shafts and the blades 24 provide cutting knives sharpened at their rounded outer ends.

As illustrated in Fig. 2, both types of disks 16 and 18 are mounted on both shafts and the slitting disks 16 on each shaft are arranged alternately with the slitting disks on the other shaft. Each shaft has two knifing disks 18 disposed between each two adjacent slitting disks 16 thereon, and the disks 16 and 18 are so arranged on the two shafts that two knifing disks 18 are disposed between each two adjacent slitting disks 16. The disks are furthermore so arranged that the two knifing disks 18 on opposite sides of each slitting disk 16 are on the shaft opposite to that carrying the slitting disk. It will be apparent that this arrangement provides twice as many knifing disks 18 as slitting disks 16 and serves to slit the meat continuously and intermittently on both sides, and the two knifing disks serve to hold the meat impaled thereon independently of the shaft carrying the slitting disk disposed therebetween.

Gearing 26 connects the two shafts 12 for rotation in opposite directions in accordance with the arrows shown in Fig. 1, and the shafts are so located that the disks 16 and 18 are disposed directly beneath a meat feeding channel 28 through the top wall of the housing.

Meat to be treated in the machine is fed downwardly through the channel 28 to and between the two rolls. The opposing blades 24 thereupon engage the meat and form intermittent tenderizing knife cuts therein and at the same time carry the meat along while the slitting disks 16 form continuous cuts thereinto. The meat is thus continuously slit and intermittently knifed on both faces.

The invention illustrated in Fig. 5 is the same as that above described except that the slitting disks 36 are mounted on one shaft 37 and the knifing disks 38 are mounted on the other shaft 39, the shafts being rotatably connected by gearing 40. The disks on the two shafts are arranged alternately and overlap at their adjacent peripheries. It will be apparent that this arrangement provides equal numbers of knifing disks 36 and slitting disks 38 and the meat is continuously slitted on one side and discontinuously knifed on the other side.

It may be explained that the slitting of the meat, by both continuous and discontinuous cuts, not only tenderizes the meat by the severance of fibres therein but furthermore substantially aids the cooking process by permitting the passage of hot cooking juices into the cuts. The continuous cuts serve substantially to sever the long fibres which extend through the meat and the discontinuous cuts serve in like manner to sever the shorter fibres but without permitting the meat to open up to the extent it would if all cuts were continuous, thereby conserving the juices which remain within the discontinuous and closed cuts. It is further explained that the tenderizing of the meat by closely disposed knife cuts therethrough and not by any mangling, tearing or crushing of the meat has very definite and valuable advantages. It is well known that the food value and flavor of meat are largely contained within the meat juices enclosed within tiny cells. Crushing or mangling of the meat destroys these cells and permits the juices to escape, and in the cooking process the heat absorbs these juices so that their value is largely lost and the meat becomes dry and unpalatable. Tenderizing the meat by knife cuts leaves most of the cells intact and when heat is applied the cells are seared over with the juices retained therein. The difference is well illustrated by a cooked steak and cooked hamburger, the former being juicy and flavorful and the latter being dry and lacking in flavor.

It is also well known that whole pieces of steak and like meats are more desirable and of greater commercial value than is meat which is broken up into small and stringy pieces, and the knifing disks 18 and 38 are adapted to serve the additional and important function of bonding such broken pieces of meat into compact and steak-like units. When such meat is to be treated it is formed into unit masses and passed a plurality of times through the machine. At each passage the knives 24 serve the additional function of tucking previously severed fibres and loose ends into the meat which has been tenderized by previous passages through the machine, the opposing disks also serving to compress the mass units of meat more compactly at each passage through the machine. It is also frequently desired to form composite meat units embodying more than one kind of meat as, for example, a beef and pork combination, and my improved machine is particularly adapted to serve this function. In such case the meat units are formed of the desired meat, in both kind and proportion, and repeated passage of the units through the machine both tenderizes and molds them into unit steaks or like servings.

It will be understood that the primary object of the invention is to provide a machine of this nature which will simultaneously serve the several functions above described and it will be apparent that modifications other than those specifically illustrated herein are contemplated and are within the scope of the invention. While the slitting disks preferably have substantially continuous annular cutting edges, it will be apparent that the invention does not require that such edges shall be wholly continuous and annular to the extent illustrated in Fig. 3 and they may advantageously be somewhat modified therefrom. For example, in Fig. 6 I have illustrated a slitting disk 46 having a substantially continuous circumferential cutting edge in the form of segments 48 so disposed that the arcuate edge of each segment cuts progressively deeper into the product as the disks are rotated in the direction of the arrow. It will furthermore be understood that the slitting and knifing disks can be given suitable arrangements, other than those herein specifically illustrated, for effecting the objects of the invention.

Having thus described my invention what I claim as new and desire to secure by Letters Patent of the United States is:

1. A meat treating machine, comprising a pair of relatively adjacent and parallel shafts mounted for rotation, relatively thin and flat meat slitting disks and meat knifing disks in spaced relation on and along each of said shafts with the disks on each shaft disposed alternately with the disks on the other shaft and extending inwardly of the peripheral outline of the disks on the other shaft, means holding the disks in said spaced relation on the shafts whereby all adjacent disks are separated by an open gap therebetween, the slitting disks on each shaft being arranged alternately with the slitting disks on the other shaft and having substantially continuous circumferential cutting edges on and along their peripheries adapted to make continuous cuts, each knifing disk having an interrupted periphery providing flat knife-like blades extending outwardly therearound in the plane of the disk and of a thickness substantially commensurate with the body portion of the disk, the blades being in relatively spaced relation and sharpened at their outer ends to make discontinuous knife cuts and the knifing disks being located between the slitting disks in such arrangement that the two disks on opposite sides of each slitting disk are knifing disks and are mounted on the shaft opposite to that carrying the slitting disk, and means connecting the shafts for rotating in opposite directions.

2. The machine defined in claim 1 in which two knifing disks are disposed on one shaft between each two relatively adjacent slitting disks on the same shaft.

3. A meat treating machine, comprising a pair of relatively adjacent and parallel shafts mounted for rotation, relatively thin and flat meat slitting disks in spaced relation on and along one of said shafts and meat knifing disks on and along the other shaft, the slitting and knifing disks being disposed alternately and each extending inwardly of the peripheral outline of the other, the slitting disks having substantially continuous circumferential cutting edges on and along their peripheries adapted to make continuous cuts and each knifing disk having an interrupted periphery providing flat knife-like blades extending outwardly therearound in the plane of the disk and of a thickness substantially commensurate with the body portion of the disk, the blades having relatively broad and sharpened outer ends and spaced a substantial distance apart with their relatively adjacent edges diverging outwardly, and means connecting the shafts for rotation in opposite directions and the disks at substantially equal peripheral speeds.

4. A meat treating machine, comprising a pair of relatively adjacent and parallel shafts mounted for rotation, relatively thin and flat meat slitting disks and meat knifing disks in spaced relation on and along the shafts with the disks on each shaft disposed alternately of the disks on the other shaft and extending inwardly of the peripheral outline of the disks on the other shaft, the slitting disks having substantially continuous circumferential cutting edges on and along their peripheries adapted to make continuous cuts and each knifing disk having an interrupted periphery providing flat knife-like blades extending outwardly therearound in the plane of the disk and of a thickness substantially commensurate with the body portion of the disk, the blades being spaced a substantial distance apart with their relatively adjacent edges diverging outwardly and their outer ends relatively broad and sharpened to make relatively broad and discontinuous knife cuts, and means connecting the shafts for rotation in opposite directions and the disks at substantially equal peripheral speeds, said knifing disks being located between the slitting disks in such arrangement that the two disks on opposite sides of each slitting disk are knifing disks and are mounted on the shaft opposite to that carrying the slitting disk.

JOSEPH P. SPANG.